(12) United States Patent (10) Patent No.: US 8,935,695 B1
Rajaa et al. (45) Date of Patent: Jan. 13, 2015

(54) SYSTEMS AND METHODS FOR MANAGING MULTIPATHING CONFIGURATIONS FOR VIRTUAL MACHINES

(75) Inventors: Subash Rajaa, Pune (IN); Sanjay Kumar, Bihar (IN); Hari Krishna Vemuri, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 280 days.

(21) Appl. No.: 13/548,195

(22) Filed: Jul. 12, 2012

(51) Int. Cl.
*G06F 9/455* (2006.01)

(52) U.S. Cl.
USPC .............................................. 718/1; 718/104

(58) Field of Classification Search
CPC . G06F 9/45533; G06F 9/4856; G06F 9/4875; G06F 9/5088
See application file for complete search history.

(56) References Cited

U.S. PATENT DOCUMENTS

| | | | |
|---|---|---|---|
| 7,669,026 B2 * | 2/2010 | Boss et al. ..................... | 711/165 |
| 7,730,486 B2 * | 6/2010 | Herington ........................ | 718/1 |
| 7,925,923 B1 * | 4/2011 | Hyser et al. ..................... | 714/13 |
| 8,341,626 B1 * | 12/2012 | Gardner et al. .................. | 718/1 |
| 8,407,182 B1 * | 3/2013 | Rajaa et al. ..................... | 707/610 |
| 8,671,238 B2 * | 3/2014 | Mashtizadeh et al. ............ | 711/6 |
| 8,732,308 B1 * | 5/2014 | Talwar et al. ................... | 709/226 |
| 2006/0085668 A1 * | 4/2006 | Garrett .............................. | 714/4 |
| 2006/0195715 A1 * | 8/2006 | Herington ........................ | 714/4 |
| 2008/0244579 A1 * | 10/2008 | Muller ........................... | 718/100 |
| 2009/0132840 A1 * | 5/2009 | Talwar et al. ................... | 713/320 |
| 2010/0333089 A1 * | 12/2010 | Talwar et al. ..................... | 718/1 |
| 2011/0145818 A1 * | 6/2011 | Vemuri et al. ................... | 718/1 |
| 2012/0017031 A1 * | 1/2012 | Mashtizadeh et al. ............ | 711/6 |
| 2012/0084445 A1 * | 4/2012 | Brock et al. .................... | 709/226 |
| 2013/0275568 A1 * | 10/2013 | Nguyen et al. ................. | 709/223 |
| 2013/0311989 A1 * | 11/2013 | Ota et al. .......................... | 718/1 |

OTHER PUBLICATIONS

EMC Corportation; Using VMware vSphere with EMC Symmetrix Storage; http://www.vmware.com/files/pdf/partners/emc/emc-vmware-using-vmware-vsphere-with-emc-symmetrix-wp.pdf, as accessed on Apr. 16, 2012.
Shai Harmelin, et al; Isilon IQ and VMware vSphere 4.1, Best Practices for VMware vSphere Using Isilon IQ Scale-out Storage; http://www.isilon.com/file-handler-show//1517/library-best-practicesguide-vmware-vsphere-0.pdf, as accessed on Apr. 16, 2012.

(Continued)

*Primary Examiner* — Van Nguyen
(74) *Attorney, Agent, or Firm* — ALG Intellectual Property, LLC

(57) ABSTRACT

A computer-implemented method for managing multipathing configurations for virtual machines may include 1) identifying a virtual machine configured to store virtual machine data on a storage system, 2) identifying a service level specification that stipulates a minimum number of input/output paths between the virtual machine and the virtual machine data, 3) determining that a number of available input/output paths between the virtual machine and the virtual machine data has fallen below the minimum number of input/output paths between the virtual machine and the virtual machine data stipulated by the service level specification, and 4) migrating at least one of the virtual machine and the virtual machine data in response to determining that the number of available input/output paths has fallen below the minimum number of input/output paths. Various other methods, systems, and computer-readable media are also disclosed.

20 Claims, 6 Drawing Sheets

(56) References Cited

OTHER PUBLICATIONS

Dell; Dell Compellent Storage Center Details; http://www.dell.com/us/enterprise/p/dell-compellent-storage-center/pd, as accessed on Apr. 16, 2012.

Cisco Systems, Inc.; Cisco VFrame Data Center 1.2 Service Orchestration Solution; http://www.cisco.com/en/US/prod/collateral/netmgtsw/ps6505/ps8463/product_data_sheet0900aecd8068ee1e.html, as accessed on Apr. 16, 2012.

Virtual Cloud: SAN Storage Operations for Enterprise System Administrators; http://virtcloud.blogspot.com/2011/07/san-storage-operations-for-enterprise.html, as accessed on Apr. 16, 2012.

James Rosikiewicz; Storage Efficiency in a Virtual Environment; http://www.phdvirtual.com/sites/default/files/pdf/whitepapers/StorageEfficiencyinVirtualEnviro.pdf, as accessed on Apr. 16, 2012.

VMWARE, Inc.; VMware Infrastructure, Server and Data Center Virtualization; http://www.vmware.com/products/vi/overview.html, as accessed on Apr. 16, 2012.

Yong Feng, et al; Virtual Disk Reconfiguration with Performance Guarantees in Shared Storage Environment; http://ieeexplore.ieee.org/xpl/freeabs_all.jsp?arnumber=1488930, as accessed on Apr. 16, 2012.

DELL Inc.; Should I use SAN storage for Microsoft Exchange 2010?; http://www.equallogic.com/resourcecenter/documentcenter.aspx, as accessed on Apr. 16, 2012.

* cited by examiner

SYSTEMS AND METHODS FOR MANAGING MULTIPATHING CONFIGURATIONS FOR VIRTUAL MACHINES

BACKGROUND

Organizations increasingly depend on digitally-stored data in the course of business. For this reason, many organizations may employ a storage array to store their data. Storage arrays may provide improved availability and maintainability through redundant components.

In a common configuration, a host system may connect to a storage array via one of multiple available input/output paths. An input/output path may represent, e.g., a network traversal combined with the use of a particular host adapter within the host system and a particular port within the storage array. If one path fails (or, e.g., includes an element scheduled for maintenance) between the host system and the storage array, the host system may use another available input/output path.

Unfortunately, in some cases an input/output path may fail. However, organizations may wish to maintain a minimum number of input/output paths connecting virtual machines and virtual machine data in order to ensure compliance with internal or external service-level standards, such as performance targets, reliability standards, governmental laws and regulations, partnership agreements with other organizations, etc. Accordingly, the instant disclosure identifies and addresses a need for additional and improved systems and methods for managing multipathing configurations for virtual machines.

SUMMARY

As will be described in greater detail below, the instant disclosure generally relates to systems and methods for managing multipathing configurations for virtual machines by tracking the number of input/output paths (or communication channels) available between virtual machines and corresponding virtual machine data and migrating virtual machines and/or virtual machine data when the number of available input/output paths falls below a stipulated number. In one example, a computer-implemented method for managing multipathing configurations for virtual machines may include 1) identifying a virtual machine configured to store virtual machine data on a storage system, 2) identifying a service level specification that stipulates a minimum number of input/output paths between the virtual machine and the virtual machine data, 3) determining that a number of available input/output paths between the virtual machine and the virtual machine data has fallen below the minimum number of input/output paths between the virtual machine and the virtual machine data stipulated by the service level specification, and 4) migrating at least one of the virtual machine and the virtual machine data in response to determining that the number of available input/output paths has fallen below the minimum number of input/output paths.

In some examples, identifying the virtual machine may include 1) identifying a connectivity map describing a plurality of input/output paths between a plurality of virtual machines and a plurality of storage locations, 2) identifying a failure of a component of at least one of the plurality of input/output paths described by the connectivity map, and 3) selecting the virtual machine based on analyzing the connectivity map to determine that at least one input/output path otherwise available to the virtual machine is affected by the failure of the component.

In some embodiments, determining that the number of available input/output paths has fallen below the minimum number of input/output paths may include determining that a host adapter for a system hosting the virtual machine failed. In these examples, the computer-implemented method may further include determining to migrate the virtual machine instead of migrating the virtual machine data based on determining that the host adapter failed.

In one example, determining that the number of available input/output paths has fallen below the minimum number of input/output paths may include determining that a port for the storage system storing the virtual machine data failed. In this example, the computer-implemented method may also include determining to migrating the virtual machine data instead of migrating the virtual machine based on determining that the port failed.

In one embodiment, determining that the number of available input/output paths has fallen below the minimum number of input/output paths may include determining that a cable within an input/output path between the virtual machine and the storage system failed. In this embodiment, the computer-implemented method may also include 1) waiting for a predetermined period of time and 2) determining that the input/output path has not been restored within the predetermined period of time. Additionally, in this embodiment, migrating the virtual machine data may be further in response to determining that the input/output path has not been restored within the predetermined period of time.

In some examples, determining that the number of available input/output paths has fallen below the minimum number of input/output paths may include determining that a plurality of components within a plurality of input/output paths between the virtual machine and the storage system failed. In these examples, the computer-implemented method may also include determining to migrate the virtual machine data instead of migrating the virtual machine based on determining that the plurality of components failed.

In some embodiments, migrating the virtual machine may include 1) identifying a host system with at least the minimum number of input/output paths available between the host system and a storage location of the virtual machine data and 2) migrating the virtual machine to the host system based on the minimum number of input/output paths being available between the host system and the storage location. In some examples, migrating the virtual machine data may include searching for and failing to identify an available host system with at least the minimum number of input/output paths available between the host system and a storage location of the virtual machine data.

In one example, migrating the virtual machine may include 1) identifying a plurality of host systems, each host system having at least the minimum number of input/output paths available between the host system and a storage location of the virtual machine data, 2) selecting an optimal host system from the plurality of host systems based on (i) a capacity of an input/output path between the optimal host system and the storage location and/or (ii) an expected performance of the input/output path between the optimal host system and the storage locations.

In one embodiment, a system for implementing the above-described method may include 1) an identification module programmed to identify a virtual machine configured to store virtual machine data on a storage system, 2) a specification module programmed to identify a service level specification that stipulates a minimum number of input/output paths between the virtual machine and the virtual machine data, 3) a determination module programmed to determine that a number of available input/output paths between the virtual machine and the virtual machine data has fallen below the minimum number of input/output paths between the virtual machine and the virtual machine data stipulated by the service level specification, and 4) a migration module programmed to migrate at least one of the virtual machine and the virtual machine data in response to determining that the number of available input/output paths has fallen below the minimum number of input/output paths. The system may also include at least one processor configured to execute the identification module, the specification module, the determination module, and the migration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a virtual machine configured to store virtual machine data on a storage system, 2) identify a service level specification that stipulates a minimum number of input/output paths between the virtual machine and the virtual machine data, 3) determine that a number of available input/output paths between the virtual machine and the virtual machine data has fallen below the minimum number of input/output paths between the virtual machine and the virtual machine data stipulated by the service level specification, and 4) migrate at least one of the virtual machine and the virtual machine data in response to determining that the number of available input/output paths has fallen below the minimum number of input/output paths.

As will be explained in greater detail below, by tracking the number of input/output paths available between virtual machines and corresponding virtual machine data and migrating virtual machines and/or virtual machine data when the number of available input/output paths falls below a stipulated number, the systems and methods described herein may help to ensure that one or more virtual machines maintain a desired level of reliability and/or performance.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
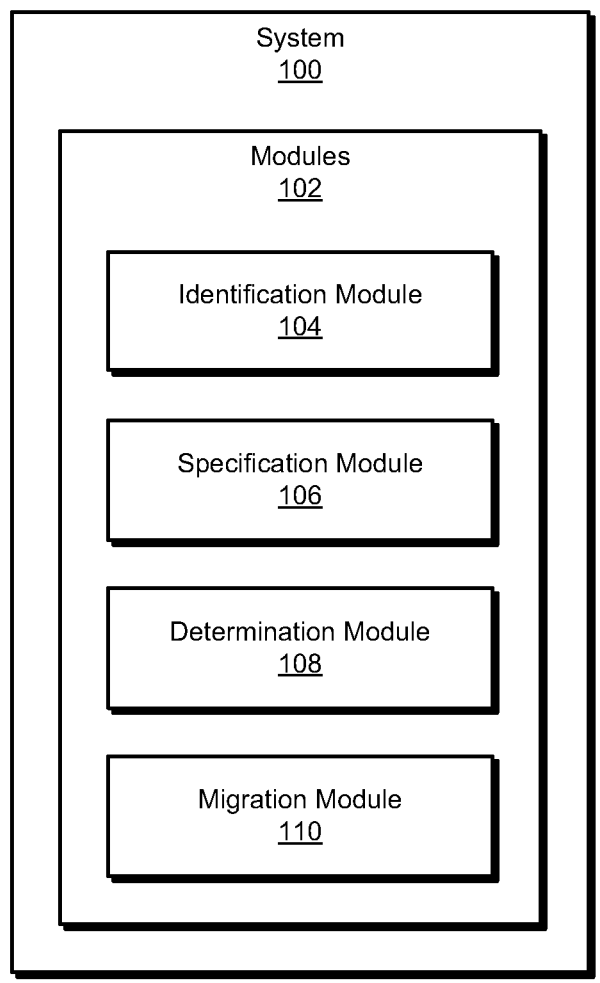
FIG. 1 is a block diagram of an exemplary system for managing multipathing configurations for virtual machines.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
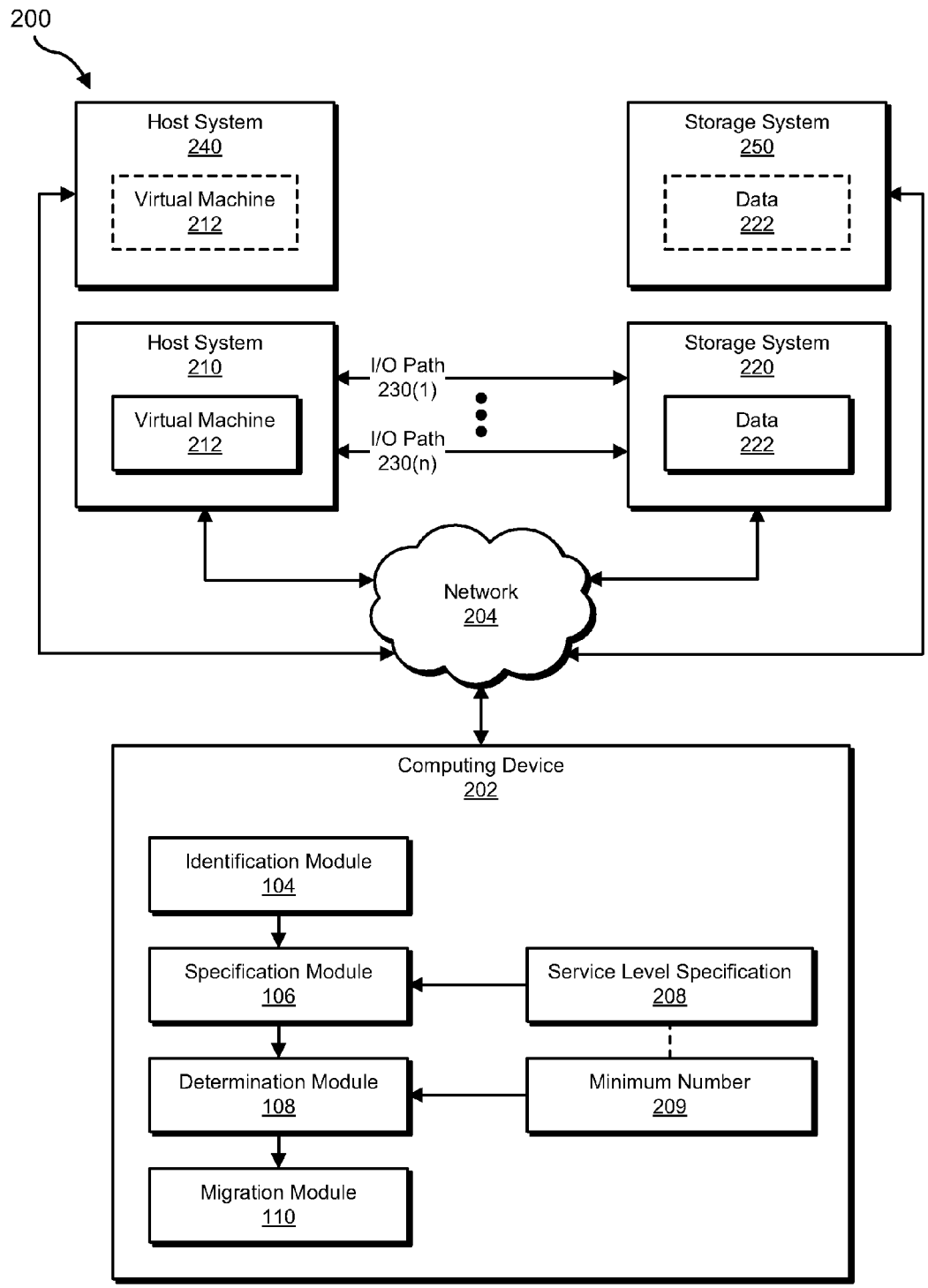
FIG. 2 is a block diagram of an exemplary system for managing multipathing configurations for virtual machines.
Figure 3:
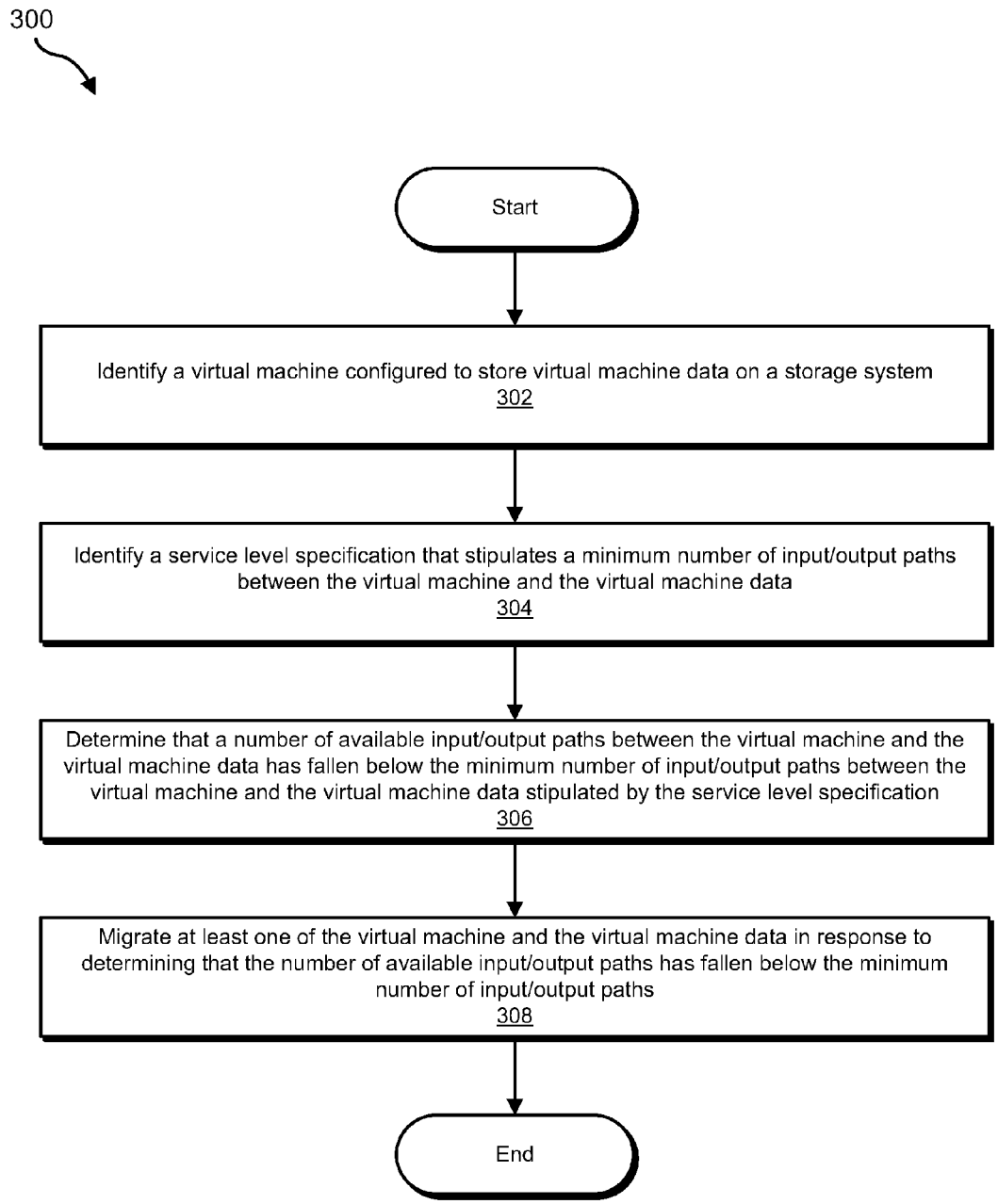
FIG. 3 is a flow diagram of an exemplary method for managing multipathing configurations for virtual machines.
Figure 4:
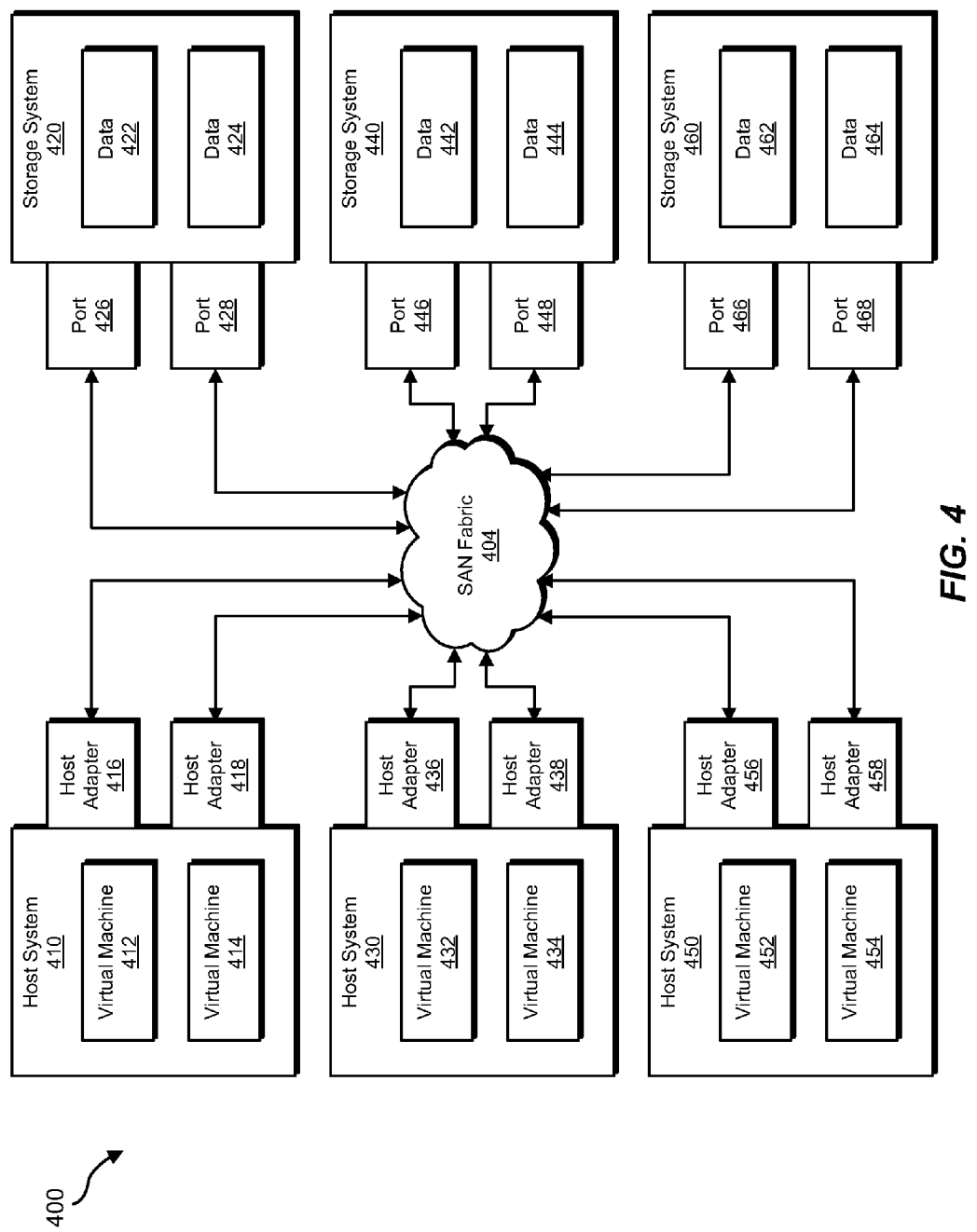
FIG. 4 is a block diagram of an exemplary system for managing multipathing configurations for virtual machines.

The following will provide, with reference to FIGS. 1, 2, and 4, detailed descriptions of exemplary systems for managing multipathing configurations for virtual machines. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing multipathing configurations for virtual machines. As illustrated in this figure, exemplary system 100 may include one or more modules 102 for performing one or more tasks. For example, and as will be explained in greater detail below, exemplary system 100 may include an identification module 104 programmed to identify a virtual machine configured to store virtual machine data on a storage system. Exemplary system 100 may also include a specification module 106 programmed to identify a service level specification that stipulates a minimum number of input/output paths between the virtual machine and the virtual machine data.

In addition, and as will be described in greater detail below, exemplary system 100 may include a determination module 108 programmed to determine that a number of available input/output paths between the virtual machine and the virtual machine data has fallen below the minimum number of input/output paths between the virtual machine and the virtual machine data stipulated by the service level specification. Exemplary system 100 may also include a migration module 110 programmed to migrate at least one of the virtual machine and the virtual machine data in response to determining that the number of available input/output paths has fallen below the minimum number of input/output paths. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, host system 210, storage system 220, host system 240, and/or storage system 250), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with host systems 210 and 240 and storage systems 220 and 250 via a network 204. In some examples, host systems 210 and 240 may be configured to host one or more virtual machines that store data on one or more storage systems (e.g., storage systems 220 and/or 250).

In one embodiment, one or more of modules 102 from FIG. 1 may, when executed by at least one processor of computing device 202, facilitate computing device 202 in managing multipathing configurations for virtual machines. For example, and as will be described in greater detail below, one or more of modules 102 may cause computing device 202 to 1) identify a virtual machine 212 configured to store virtual machine data 222 on storage system 220, 2) identify a service level specification 208 that stipulates a minimum number of input/output paths (e.g., a minimum number 209) between virtual machine 212 and virtual machine data 222, 3) determine that a number of available input/output paths 230(1)-(n) between virtual machine 212 and virtual machine data 222 has fallen below the minimum number of input/output paths (e.g., minimum number 209) between the virtual machine 212 and virtual machine data 222 stipulated by service level specification 208, and 4) migrate virtual machine 212 and/or virtual machine data 222 in response to determining that the number of available input/output paths 230(1)-(n) has fallen below the minimum number 209 of input/output paths.

Computing device 202 generally represents any type or form of computing device capable of reading computer-executable instructions. Examples of computing device 202 include, without limitation, servers, desktops, laptops, tablets, cellular phones, personal digital assistants (PDAs), multimedia players, embedded systems, combinations of one or more of the same, exemplary computing system 510 in FIG. 5, or any other suitable computing device. In some examples, computing device 202 may represent a computing system for managing and/or migrating virtual machines, input/output paths, and/or network resources. Although identification module 104, specification module 106, determination module 108, and migration module 110 are depicted on computing device 202, in some examples one or more of the modules may operate instead or in addition on another computing system (e.g., host system 210 and/or host system 240).

Host systems 210 and 240 generally represents any type or form of computing device that is capable of hosting one or more virtual machines. Examples of host systems 210 and 240 include, computing systems configured to run virtualization software, hypervisors, and/or computing clusters.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Storage systems 220 and 250 may each represent portions of a single storage device or a plurality of storage devices. For example, storage systems 220 and 250 may represent a portion of computing system 510 in FIG. 5 and/or portions of exemplary network architecture 600 in FIG. 6. Alternatively, storage systems 220 and 250 in FIG. 2 may represent one or more physically separate devices capable of being accessed by a computing device, such as host systems 210 and 240 in FIG. 2, computing device 202 in FIG. 2, computing system 510 in FIG. 5, and/or portions of exemplary network architecture 600 in FIG. 6. In some examples, storage systems 220 and 250 may represent storage arrays.

FIG. 3 is a flow diagram of an exemplary computer-implemented method 300 for managing multipathing configurations for virtual machines. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a virtual machine configured to store virtual machine data on a storage system. For example, at step 302 identification module 104 may, as part of computing device 202 in FIG. 2, identify virtual machine 212 configured to store virtual machine data 222 on storage system 220.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

As used herein, the phrase "virtual machine data" may refer to any data stored for the use of a virtual machine. For example, "virtual machine data" may refer to a file and/or image containing data stored for the use of a virtual machine. In some examples, "virtual machine data" may refer to a virtual machine disk image reflecting the raw contents and/or structure of a virtual storage device.

As used herein, the phrase "storage system" may refer to any refer to any storage device and/or collection of storage devices capable of storing virtual machine data. In some examples, the phrase "storage system" may refer to a storage array.

Identification module 104 may identify the virtual machine in any suitable manner. For example, identification module 104 may identify the virtual machine by identifying a list of virtual machines operating on a network. Additionally or alternatively, identification module 104 may identify the virtual machine by reading a configuration file identifying the virtual machine. In some examples, identification module 104 may identify the virtual machine by receiving a message identifying the virtual machine (e.g., from a host system hosting the virtual machine). In one example, identification module 104 may identify the virtual machine by a suboptimal network performance issue traceable to the virtual machine.

In some examples, identification module 104 may identify the virtual machine by 1) identifying a connectivity map describing a plurality of input/output paths between a plurality of virtual machines and a plurality of storage locations, 2) identifying a failure of a component of at least one of the plurality of input/output paths described by the connectivity map, and 3) selecting the virtual machine based on analyzing the connectivity map to determine that at least one input/output path otherwise available to the virtual machine is affected by the failure of the component. As used herein, the phrase "input/output path" may refer to any element or series of elements in a data transfer infrastructure, such as adapters, cables, transmitters, switches, controllers, ports, storage processors, end devices, and/or software modules. Generally, the phrase "input/output path" may refer to any communication channel.

Identification module 104 may identify the connectivity map in any suitable manner. In some examples, identification module 104 may generate the connectivity map. For example, identification module 104 may identify storage configuration information from one or more host systems, identify and/or generate a network topology, determine which host systems are connected to which storage array ports, determine which virtual machines are running on which host systems, determine which logical units are mapped to which virtual machines, and/or determine which applications run on the virtual machines.

Identification module 104 may identify the failure of the component in any suitable manner. In some examples, the failure may include a hardware fault. Additionally or alternatively, the failure may include a planned and/or scheduled failure (e.g., for maintenance, removal, replacement, and/or reconfiguration). The component may include any element of an input/output path (e.g., an adapter, a cable, a transmitter, a switch, a controller, a port, a storage processor, an end device, a software module, etc.). Accordingly, as used herein, the term "failure" as it relates to an input/output path may refer to any unplanned failure and/or any planned and/or scheduled failure (e.g., for maintenance, removal, replacement, reconfiguration, and/or downtime) of the input/output path. Likewise, the term "failure" as it relates to a component of an input/output path may refer to any unplanned failure and/or any planned and/or scheduled failure of the component (e.g., a disabling of the component, a powering off of the component, and/or a configuration of the component to render the component non-operational). Accordingly, the term "failed" may refer to an input/output path and/or component thereof which has stopped operation. Additionally or alternatively, the term "failed" may refer to an input/output path and/or component thereof which has been selected to go offline (e.g., in the near future) according to a predetermined schedule, a configuration, and/or an administrative command and/or action. For example, an input/output path and/or component may have "failed" according to the usage of the term herein if the path and/or component is currently operational but scheduled for and/or in preparation of stopping operation. Accordingly, the systems and methods described herein may preemptively migrate virtual machines and/or virtual machine data before scheduled downtime of one or more input/output paths and/or components bring a minimum number of input/output paths between virtual machines and corresponding virtual machine data below defined service level specifications.

FIG. 4 illustrates an exemplary system 400 for managing multipathing configurations for virtual machines. As shown in FIG. 4, exemplary system 400 may include a SAN fabric 404 connecting host systems 410, 430, and 450 to storage systems 420, 440, and 460. Using FIG. 4 as an example, at step 302 identification module 104 may identify a virtual machine 412 (e.g., running on host system 410) that stores data 442 on storage system 440. Furthermore, in some examples, identification module 104 may create a connectivity map of system 400 (e.g., including the relative locations of virtual machines 412, 414, 432, 434, 452, and 454; host adapters 416, 418, 436, 438, 456, and 458; ports 426, 428, 446, 448, 466, and 468; the relative locations of data 422, 424, 442, 444, 462, and 464; and/or one or more elements of SAN fabric 404, such as cables, switches, etc.).

Returning to FIG. 3, at step 304 one or more of the systems described herein may identify a service level specification that stipulates a minimum number of input/output paths between the virtual machine and the virtual machine data. For example, at step 304 specification module 106 may, as part of computing device 202 in FIG. 2, identify service level specification 208 that stipulates a minimum number of input/output paths (e.g., minimum number 209) between virtual machine 212 and virtual machine data 222.

As used herein, the phrase "service level specification" may refer to any standard, rule, policy, service-level agreement, configuration, and/or threshold relating to virtual machines, data transmission, storage, and/or input/output paths. In some examples, the service level specification may explicitly stipulate a fixed minimum number of input/output paths. Additionally or alternatively, the service level specification may specify an algorithm for determining a minimum number of input/output paths and/or one or more values to apply to such an algorithm (e.g., for guaranteeing a specified level of performance and/or reliability). In some examples, the service level specification may also stipulate one or more additional and/or associated standards for input/output paths. For example, the service level specification may stipulate a minimum bandwidth requirement for each of the minimum number of input/output paths.

Specification module 106 may identify the service level specification in any suitable manner. For example, specification module 106 may identify the service level specification by reading a configuration file. Additionally or alternatively, specification module 106 may identify the service level specification as a part of a larger policy ruleset. In some examples, the service level specification may pertain to the virtual machine specifically. Additionally or alternatively, the service level specification may pertain to a select group of virtual machines. In some examples, the service level specification may pertain to all virtual machines within an enterprise.

Using FIG. 4 as an example, specification module 106 may identify a service level specification that stipulates a minimum number of input/output paths between virtual machine 412 and data 442.

Returning to FIG. 3, at step 306 one or more of the systems described herein may determine that a number of available input/output paths between the virtual machine and the virtual machine data has fallen below the minimum number of input/output paths between the virtual machine and the virtual machine data stipulated by the service level specification. For example, at step 306 determination module 108 may, as part of computing device 202 in FIG. 2, determine that a number of available input/output paths 230(1)-(n) between virtual machine 212 and virtual machine data 222 has fallen below the minimum number of input/output paths (e.g., minimum number 209) between the virtual machine 212 and virtual machine data 222 stipulated by service level specification 208.

Determination module 108 may determine that the number of available input/output paths has fallen below the minimum number of input/output paths in any of a variety of ways. For example, as mentioned earlier, in some examples one or more of the systems described herein may identify, generate, and/or maintain a connectivity map of a network (e.g., a storage area network). In these examples, determination module 108 may traverse the connectivity map to count the number of available input/output paths between the virtual machine and the virtual machine data. Additionally or alternatively, determination module 108 may determine that the number of available input/output paths has fallen below the minimum number of input/output paths by identifying a failure of an input/ output path between the virtual machine and virtual machine data and inferring from the failure that the number of available input/output paths has fallen below the minimum number.

In some examples, determination module 108 may also select a type of migration to perform (e.g., based on a current network topology and/or based on a type of failure that led to a failure of an input/output path between the virtual machine and the virtual machine data). For example, determination module 108 may determine that the number of available input/output paths has fallen below the minimum number of input/output paths by determining that a host adapter for a system hosting the virtual machine failed. In this example, determination module 108 may determine to migrate the virtual machine instead of migrating the virtual machine data based on determining that the host adapter failed. As used herein, the phrase "host adapter" may refer to any controller and/or adapter for connecting a host system to a network and/or storage device. For example, the phrase "host adapter" may refer to host controller and/or a host bus adapter. Determination module 108 may determine which component failed in any suitable manner. For example, determination module 108 may determine which component failed by receiving a message from a dynamic multipathing system and/or by accessing a management interface of a switch and/or storage array.

In some examples, determination module 108 may determine that the number of available input/output paths has fallen below the minimum number of input/output paths by determining that a port for the storage system storing the virtual machine data failed. In these examples, determination module 108 may also determine to migrate the virtual machine data instead of migrating the virtual machine based on determining that the port failed. As used herein, the term "port" may refer to physical and/or logical connection point between a storage system and a network and/or computing system. In some examples, the storage system may include more than one port. In some examples, a storage processor may include one or more ports, and the storage system may include more than one storage processor.

In one example, determination module 108 may determine that the number of available input/output paths has fallen below the minimum number of input/output paths by determining that a cable within an input/output path between the virtual machine and the storage system failed. In this example, determination module 108 may also 1) wait for a predetermined period of time and 2) determine that the input/output path has not been restored within the predetermined period of time. For example, determination module 108 may monitor and/or periodically check the input/output path for the predetermined period of time (e.g., for 30 minutes). As will be explained in greater detail below, in some examples one or more of the systems described herein may migrate the virtual machine data partly in response to determining that the input/output path has not been restored within the predetermined period of time.

In some examples, determination module 108 may determine that the number of available input/output paths has fallen below the minimum number of input/output paths by determining that a plurality of components within a plurality of input/output paths between the virtual machine and the storage system failed. In these examples, determination module 108 may also determine to migrate the virtual machine data instead of migrating the virtual machine based on determining that the plurality of components failed. For example, determination module 108 may determine that a host adapter, a storage array port, and a cable failed.

Generally, determination module 108 may select a migration type and/or migration procedure based on any of a variety of component failures. For example, determination module 108 may select a migration type based on a switch failure, a storage processor failure, a storage array failure, etc.

Using FIG. 4 as an example, at step 306 determination module 108 may determine that the number of available input/output paths between virtual machine 412 and data 442 has fallen below the minimum number of input/output paths. For example, the service level specification may stipulate a minimum of two input/output paths, and determination module 108 may determine that host adapter 416 has failed and that there is only one input/output path left between virtual machine 412 and data 442.

Returning to FIG. 3, at step 308 one or more of the systems described herein may migrate at least one of the virtual machine and the virtual machine data in response to determining that the number of available input/output paths has fallen below the minimum number of input/output paths. For example, at step 308 migration module 110 may, as part of computing device 202 in FIG. 2, migrate virtual machine 212 and/or virtual machine data 222 in response to determining that the number of available input/output paths 230(1)-(n) has fallen below the minimum number 209 of input/output paths.

As used herein, the terms "migrating" and "migration" as applied to virtual machines may refer to any operation for transferring a virtual machine from one host system to another host system. As used herein, the terms "migrating" and "migration" as applied to virtual machine data may refer to any operation for transferring data accessed by a virtual machine from one storage system and/or logical unit to another storage system and/or logical unit. In some examples, a migration may include a live migration.

As used herein, the phrase "live migration" as applied to virtual machine data may refer to any migration and/or transfer of data that minimizes and/or eliminates downtime for a workload, application, and/or virtual machine that stores, accesses, and/or otherwise uses the data. For example, the phrase "live migration" may refer to copying data from an original location to a target location before removing the data from the original location. In some examples, the live migration may include ensuring that all write transactions to the data during the live migration are reflected at the target location at the end of the live migration and that an up-to-date version of the data is available throughout the live migration.

As used herein, the phrase "live migration" as applied to virtual machines may refer to any migration and/or transfer of a virtual machine that minimizes and/or eliminates downtime for the virtual machine. For example, the phrase "live migration" may refer to statefully copying a virtual machine from one host system to another host system and bringing the stateful copy of the virtual machine online (e.g., running and available for transactions) before the original instance of the virtual machine is taken offline. In some examples, the live migration may include copying an execution state (e.g., a virtual processor and the state of the virtual processor) and a memory state (e.g., a virtual random-access memory module and the state of the memory module) from the original host system to the new host system.

As mentioned earlier, in some examples, one or more of the systems described herein may 1) determining that a cable within an input/output path between the virtual machine and the storage system failed, 2) wait for a predetermined period of time and 3) determine that the input/output path has not been restored within the predetermined period of time. In these examples, migration module 110 may migrate the virtual machine data partly in response to determining that the input/output path has not been restored within the predetermined period of time.

In some embodiments, migration module 110 may migrate the virtual machine by 1) identifying a host system with at least the minimum number of input/output paths available between the host system and a storage location of the virtual machine data and 2) migrating the virtual machine to the host system based on the minimum number of input/output paths being available between the host system and the storage location. For example, migration module 110 may identify a connectivity map describing a network and identify the host system meeting the minimum number of input/output paths based on the connectivity map.

In some examples, migration module 110 may migrate the virtual machine data by first searching for and failing to identify an available host system with at least the minimum number of input/output paths available between the host system and a storage location of the virtual machine data. For example, migration module 110 may identify a connectivity map describing a network and determine, based on the connectivity map, that there is no available host system with the minimum number of input/output paths available. As mentioned earlier, in some examples, the service level specification may stipulate a performance requirement (e.g., a capacity and/or bandwidth requirement) for the input/output paths between the virtual machine and the virtual machine data. Accordingly, migration module 110 may determine that there is no available host system with the minimum number of input/output paths available meeting the performance requirement and/or any other requirements stipulated by the service level specification.

In one example, migration module 110 may identify a plurality of host systems that have at least the minimum number of input/output paths available between the respective host system and a storage location of the virtual machine data and select an optimal host system from the plurality of host systems based on (1) a capacity of an input/output path between the optimal host system and the storage location and/or (2) an expected performance of the input/output path between the optimal host system and the storage locations. For example, migration module 110 may determine that an available input/output path between the optimal host system and the storage location has an amount of average available bandwidth exceeding a specified threshold. Additionally or alternatively, migration module 110 may determine that an available input/output path between the optimal host system and the storage location has an expected performance below a specified threshold. Generally migration module 110 may select the optimal host system based on any load balancing criteria and/or projected performance metric (e.g., an expected throughput, reliability, etc. of the available input/output path).

Likewise, in those examples in which migration module 110 migrates the virtual machine data, migration module 110 may use any suitable criteria for selecting a target location for migrating the virtual machine data. For example, migration module 110 may identify a target location (e.g., a different storage array) such that the number of available input/output paths between the virtual machine and the target location meets the minimum number of input/output paths as stipulated in the service level specification. In some examples, migration module 110 may identify a plurality of prospective target locations meeting the minimum number of input/output paths. In these examples, migration module 110 may select an optimal target location for the virtual machine data based on any of a variety of additional criteria. For example, migration module 110 may select the optimal target location based on the optimal target location meeting other requirements stipulated by the service level specification, such as minimum capacity requirements. Additionally or alternatively, migration module 110 may select the optimal target location for the virtual machine data based on load balancing criteria for the network, a total number of available input/output paths between the virtual machine and the optimal target location, and/or attributes of the underlying storage array of the optimal target location (e.g., input/output speed, reliability, native capabilities such as encryption, etc.).

As explained above, by tracking the number of input/output paths available between virtual machines and corresponding virtual machine data and migrating virtual machines and/or virtual machine data when the number of available input/output paths falls below a stipulated number, the systems and methods described herein may help to ensure that one or more virtual machines maintain a desired level of reliability and/or performance.

Figure 5:
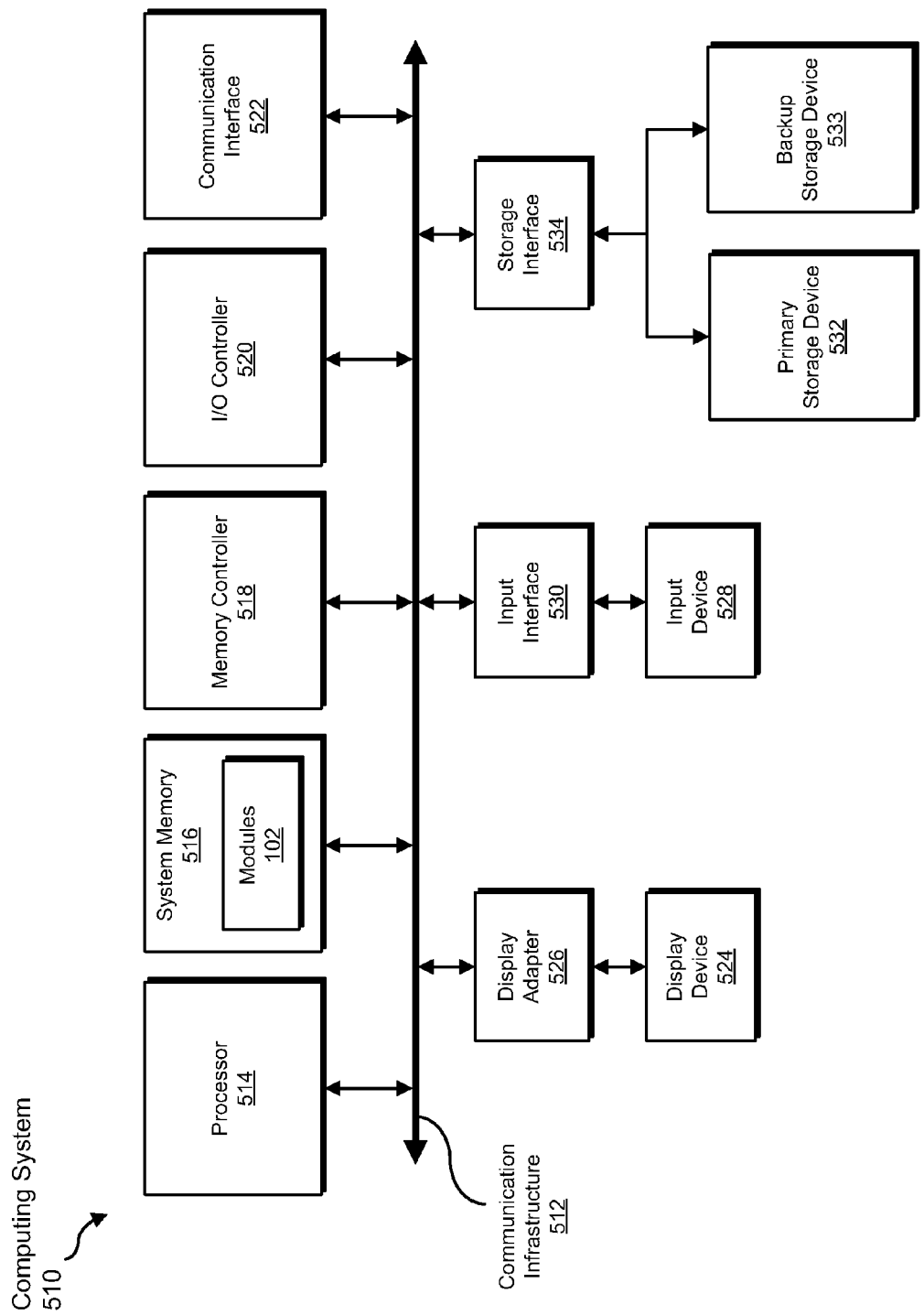
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, selecting, determining, waiting, migrating, and searching steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
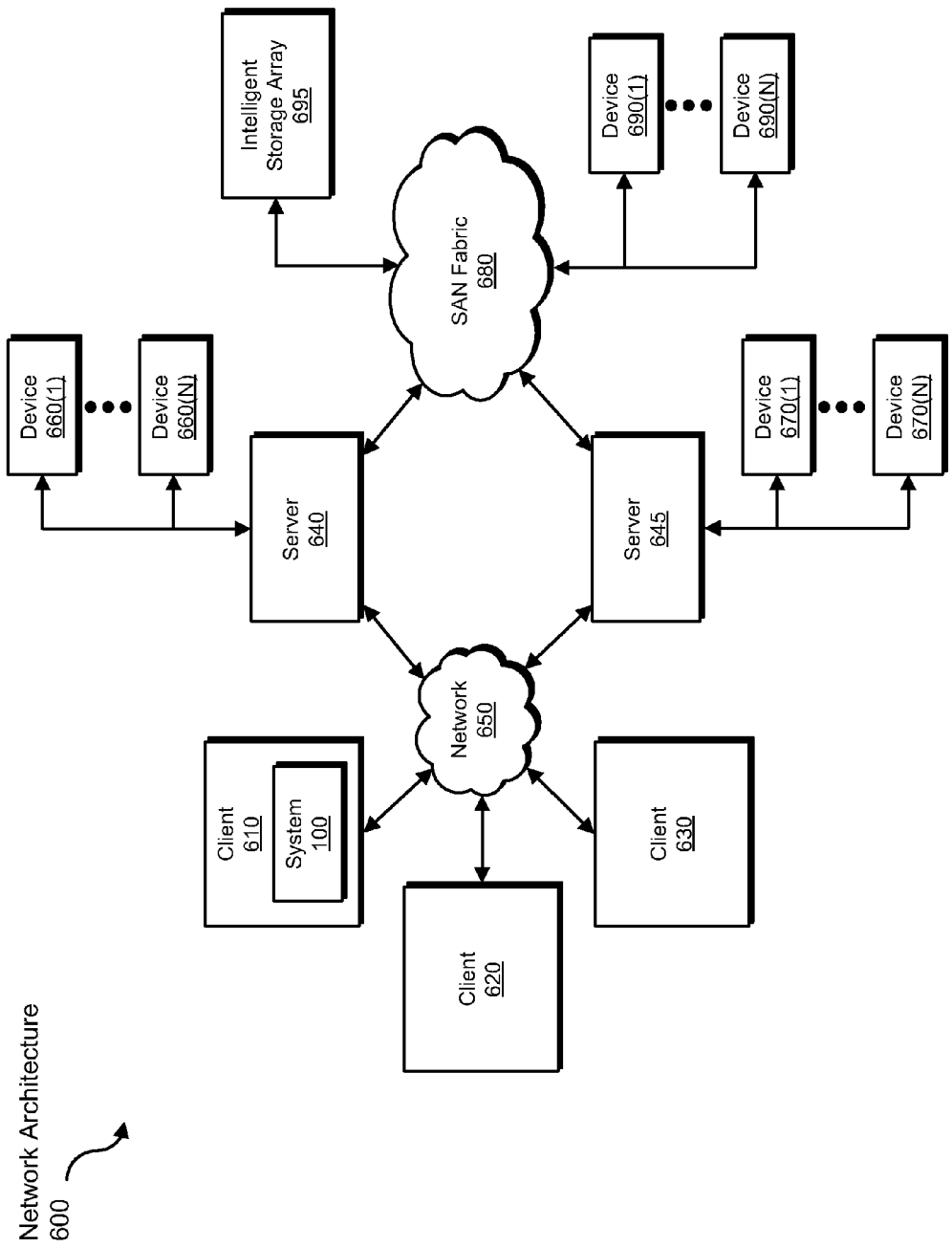
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, selecting, determining, waiting, migrating, and searching steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing multipathing configurations for virtual machines.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for managing multipathing configurations for virtual machines.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing multipathing configurations for virtual machines, at least a portion of the method being performed by a computing device comprising at least one processor, the method comprising:
    identifying a virtual machine that stores virtual machine data on a storage system by:
        identifying a connectivity map describing a plurality of input/output paths between a plurality of virtual machines and a plurality of storage locations;
        identifying a failure of a component of at least one of the plurality of input/output paths described by the connectivity map;
        selecting the virtual machine based on analyzing the connectivity map to determine that at least one input/output path otherwise available to the virtual machine is affected by the failure of the component;
    identifying a service level specification that stipulates a minimum number of input/output paths between the virtual machine and the virtual machine data;
    determining that a number of available input/output paths between the virtual machine and the virtual machine data has fallen below the minimum number of input/output paths between the virtual machine and the virtual machine data stipulated by the service level specification;
    migrating at least one of the virtual machine and the virtual machine data in response to determining that the number of available input/output paths has fallen below the minimum number of input/output paths.

2. The computer-implemented method of claim 1,
    wherein determining that the number of available input/output paths between the virtual machine and the virtual machine data has fallen below the minimum number of input/output paths comprises determining that a host adapter for a system hosting the virtual machine failed;
    further comprising determining to migrate the virtual machine instead of migrating the virtual machine data based on determining that the host adapter failed.

3. The computer-implemented method of claim 1,
    wherein determining that the number of available input/output paths between the virtual machine and the virtual machine data has fallen below the minimum number of input/output paths comprises determining that a port for the storage system storing the virtual machine data failed;
    further comprising determining to migrate the virtual machine data instead of migrating the virtual machine based on determining that the port failed.

4. The computer-implemented method of claim 1,
    wherein determining that the number of available input/output paths between the virtual machine and the virtual machine data has fallen below the minimum number of input/output paths comprises determining that a cable within an input/output path between the virtual machine and the storage system failed;
    further comprising:
    waiting for a predetermined period of time;
    determining that the input/output path has not been restored within the predetermined period of time;
    wherein migrating the virtual machine data is further in response to determining that the input/output path has not been restored within the predetermined period of time.

5. The computer-implemented method of claim 1, wherein:
    wherein determining that the number of available input/output paths between the virtual machine and the virtual machine data has fallen below the minimum number of input/output paths comprises determining that a plurality of components within a plurality of input/output paths between the virtual machine and the storage system failed;
    further comprising determining to migrate the virtual machine data instead of migrating the virtual machine based on determining that the plurality of components failed.

6. The computer-implemented method of claim 1, wherein the failure of the component comprises a scheduled failure of the component.

7. The computer-implemented method of claim 1, wherein migrating the virtual machine comprises:
    identifying a host system with at least the minimum number of input/output paths available between the host system and a storage location of the virtual machine data;
    migrating the virtual machine to the host system based on the minimum number of input/output paths being available between the host system and the storage location.

8. The computer-implemented method of claim 1, wherein migrating the virtual machine data comprises searching for and failing to identify an available host system with at least the minimum number of input/output paths available between the host system and a storage location of the virtual machine data.

9. The computer-implemented method of claim 1, wherein migrating the virtual machine comprises:
    identifying a plurality of host systems, each host system having at least the minimum number of input/output paths available between the host system and a storage location of the virtual machine data;
    selecting an optimal host system from the plurality of host systems based on at least one of:
    a capacity of an input/output path between the optimal host system and the storage location;
    an expected performance of the input/output path between the optimal host system and the storage locations.

10. A system for managing multipathing configurations for virtual machines, the system comprising:
    an identification module programmed to identify a virtual machine that stores virtual machine data on a storage system by:

identifying a connectivity map describing a plurality of input/output paths between a plurality of virtual machines and a plurality of storage locations;

identifying a failure of a component of at least one of the plurality of input/output paths described by the connectivity map;

selecting the virtual machine based on analyzing the connectivity map to determine that at least one input/output path otherwise available to the virtual machine is affected by the failure of the component;

a specification module programmed to identify a service level specification that stipulates a minimum number of input/output paths between the virtual machine and the virtual machine data;

a determination module programmed to determine that a number of available input/output paths between the virtual machine and the virtual machine data has fallen below the minimum number of input/output paths between the virtual machine and the virtual machine data stipulated by the service level specification;

a migration module programmed to migrate at least one of the virtual machine and the virtual machine data in response to determining that the number of available input/output paths has fallen below the minimum number of input/output paths;

at least one processor configured to execute the identification module, the specification module, the determination module, and the migration module.

11. The system of claim 10, wherein the determination module is programmed to determine that the number of available input/output paths between the virtual machine and the virtual machine data has fallen below the minimum number of input/output paths by determining that a host adapter for a system hosting the virtual machine failed;

wherein the determination module is further programmed to determining to migrate the virtual machine instead of migrating the virtual machine data based on determining that the host adapter failed.

12. The system of claim 10, wherein the determination module is programmed to determine that the number of available input/output paths between the virtual machine and the virtual machine data has fallen below the minimum number of input/output paths by determining that a port for the storage system storing the virtual machine data failed;

wherein the determination module is further programmed to determine to migrate the virtual machine data instead of migrating the virtual machine based on determining that the port failed.

13. The system of claim 10, wherein the determination module is programmed to determine that the number of available input/output paths between the virtual machine and the virtual machine data has fallen below the minimum number of input/output paths by determining that a cable within an input/output path between the virtual machine and the storage system failed;

wherein the determination module is further programmed to:

wait for a predetermined period of time;

determine that the input/output path has not been restored within the predetermined period of time;

wherein the migration module is programmed to migrate the virtual machine data further in response to determining that the input/output path has not been restored within the predetermined period of time.

14. The system of claim 10, wherein:

wherein the determination module is programmed to determine that the number of available input/output paths between the virtual machine and the virtual machine data has fallen below the minimum number of input/output paths by determining that a plurality of components within a plurality of input/output paths between the virtual machine and the storage system failed;

wherein the determination module is further programmed to determine to migrate the virtual machine data instead of migrating the virtual machine based on determining that the plurality of components failed.

15. The system of claim 10, wherein the failure of the component comprises a scheduled failure of the component.

16. The system of claim 10, wherein the migration module is programmed to migrate the virtual machine by:

identifying a host system with at least the minimum number of input/output paths available between the host system and a storage location of the virtual machine data;

migrating the virtual machine to the host system based on the minimum number of input/output paths being available between the host system and the storage location.

17. The system of claim 10, wherein the migration module is programmed to migrate the virtual machine data by searching for and failing to identify an available host system with at least the minimum number of input/output paths available between the host system and a storage location of the virtual machine data.

18. A non-transitory computer-readable-storage medium comprising one or more computer-executable instructions that, when executed by at least one processor of a computing device, cause the computing device to:

identify a virtual machine that stores virtual machine data on a storage system by:

identifying a connectivity map describing a plurality of input/output paths between a plurality of virtual machines and a plurality of storage locations;

identifying a failure of a component of at least one of the plurality of input/output paths described by the connectivity map;

selecting the virtual machine based on analyzing the connectivity map to determine that at least one input/output path otherwise available to the virtual machine is affected by the failure of the component;

identify a service level specification that stipulates a minimum number of input/output paths between the virtual machine and the virtual machine data;

determine that a number of available input/output paths between the virtual machine and the virtual machine data has fallen below the minimum number of input/output paths between the virtual machine and the virtual machine data stipulated by the service level specification;

migrate at least one of the virtual machine and the virtual machine data in response to determining that the number of available input/output paths has fallen below the minimum number of input/output paths.

19. The computer-readable-storage medium of claim 18, wherein determining that the number of available input/output paths between the virtual machine and the virtual machine data has fallen below the minimum number of input/output paths comprises determining that a host adapter for a system hosting the virtual machine failed;

wherein the one or more computer-executable instructions further cause the computing device to determine to migrate the virtual machine instead of migrating the virtual machine data based on determining that the host adapter failed.

20. The computer-readable-storage medium of claim 18,
wherein determining that the number of available input/output paths between the virtual machine and the virtual machine data has fallen below the minimum number of input/output paths comprises determining that a port for the storage system storing the virtual machine data failed;
wherein the one or more computer-executable instructions further cause the computing device to determine to migrate the virtual machine data instead of migrating the virtual machine based on determining that the port failed.

\* \* \* \* \*